United States Patent [19]
Okaniwa et al.

[11] 3,958,287
[45] May 25, 1976

[54] DISCHARGEABLE BLACK DYEING ON ACID MODIFIED POLYESTER FIBER

[75] Inventors: Tetsuo Okaniwa, Minoo; Sadaharu Abeta, Toyonaka, both of Japan

[73] Assignee: Sumitomo Chemical Company, Limited, Osaka, Japan

[22] Filed: May 27, 1975

[21] Appl. No.: 581,304

[30] Foreign Application Priority Data
May 24, 1974 Japan............................. 49-58948
May 24, 1974 Japan............................. 49-58949

[52] U.S. Cl. .................................. 8/26; 8/41 C;
    8/168 C; 8/64
[51] Int. Cl.² ........................................ D06P 1/08
[58] Field of Search .............. 8/26, 41 C, 168 C, 64

[56] References Cited
UNITED STATES PATENTS
3,413,075  11/1968  Rotcop et al. ............................. 8/26
3,874,847  4/1975  Ohkawa et al. ......................... 8/41 C FOREIGN PATENTS OR APPLICATIONS
728,033    7/1969   Belgium
1,011,396  7/1957   Germany
1,044,023  11/1958  Germany
1,050,940  2/1959   Germany
46-15791   4/1971   Japan
39-242     1/1974   Japan
787,369    12/1957  United Kingdom Primary Examiner—Joseph L. Schofer
Assistant Examiner—A. L. Clingman
Attorney, Agent, or Firm—Sughrue, Rothwell, Mion, Zinn & Macpeak

[57] ABSTRACT

A process to dye acid modified polyester fibers, such as Dacron T-64 fibers, a dischargeable black by dyeing the fibers with a mixture of six different basic dyes.

9 Claims, No Drawings

DISCHARGEABLE BLACK DYEING ON ACID MODIFIED POLYESTER FIBER

BACKGROUND OF THE INVENTION

1. Field of the Invention

The present invention relates to a dischargeable black dyeing of acid modified polyester fibers. More particularly, the present invention relates to a process for dyeing acid modified polyester fibers black, which is partially white or color-dischargeable using a dyeing bath containing a combination of specific dyes.

2. Description of the Prior Art

Polyester fibers have been used widely as a synthetic fiber having excellent physical properties for cloth. However, it has thus far been difficult to ground-dye such fibers black which is partially white or color-dischargeable.

Separately from this, a number of attempts have been made of modify polyester fibers so that they can be dyed with cationic dyes, and one such attempt is disclosed in, for example, Japanese Pat. No. 10,497/1959 in which sulfoisophthalic acid is copolymerized as an acidic material to produce the polyester fiber.

However, when so modified polyester fibers are dyed with a commercially available black cationic dye for polyacrylonitrile fiber, the black dyeings obtained can hardly be discharged. Additionally, when the fibers are dyed black with a combination of dyes which are conventionally used for dischargeable dyeing of acrylic fibers, the black dyeings obtained change in color, on discharge treatment, also in areas other than those to be discharged. Therefore, such a combination of dyes is completely unsuitable for practical use. The reason is as follows. The steaming treatment for discharging black dyeings of acrylic fibers is carried out at a temperature of about 100° to 105°C, on the other hand, the steaming temperature must be increased to about 120° to 130°C for discharging black dyeings of modified polyester fibers. Therefore, easily dischargeable cationic dyes can not withstand this high temperature steaming.

SUMMARY OF THE INVENTION

Research has been conducted on methods for dyeing acid modified polyester fibers such as Dacron T-92 (a registered trade mark for acid modified polyester fibers of E.I. du Pont Nemours and Co.) a deep black color which is dischargeable and moreover does not change in color, as a result of the discharge treatment, in areas other than those to be discharged, and it has been found that black dyeings can be obtained by dyeing acid modified polyester fibers with a dyeing bath containing a specific combination of dyes, the combination being:

1. at least one dye of the formula (A) and at least one dye of the formula (B), (C) or (D),
2. at least one dye of the formula (A), at least one dye of the formula (E) and at least one dye of the formula (B), (C) or (D),
3. at least one dye of the formula (A), at least one dye of the formula (F) and at least one dye of the formula (B), (C) or (D), or
4. at least one dye of the formula (A), at least one dye of the formula (E), at least one dye of the formula (F) and at least one dye of the formula (B), (C) or (D), the formulas (A) to (F) being described hereinbelow.

That is, the present invention provides a dischargeable black dyeing process for acid modified polyester fibers which comprises contacting the polyester fibers with a dye bath containing a combination of dyes, the combination comprising 1. at least one dye of the formula (A):

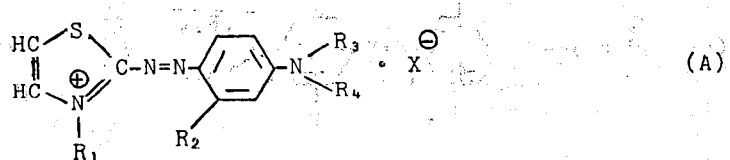

wherein $R_1$ is $C_1-C_3$ alkyl group which may be unsubstituted or substituted with a hydroxy group or a $C_1-C_4$ alkoxy group; $R_2$ is a hydrogen atom or a $C_1-C_3$ alkyl group; $R_3$ and $R_4$, which may be the same or different, each is a cyclohexyl group, a $C_1-C_3$ alkyl group which may be unsubstituted or substituted with a hydroxy group or a $C_1-C_4$ alkoxy group, a phenyl group or a $C_7-C_8$ aralkyl group, which phenyl or aralkyl group may be unsubstituted or substituted with a halogen atom; and $X^\ominus$ is an anion; and 2. at least one dye of the formula (B):

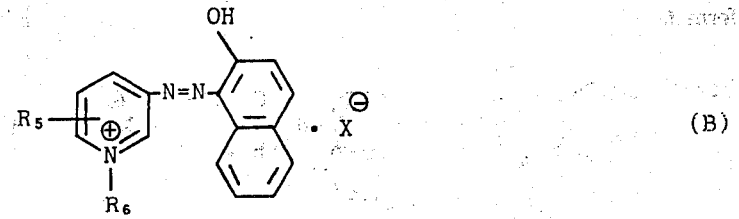

wherein $R_5$ is a hydrogen atom, a $C_1-C_{12}$ alkyl group or a $C_7-C_8$ aralkyl group, which alkyl or aralkyl group may be unsubstituted or substituted with a halogen atom, a hydroxy group or a $C_1-C_4$ alkoxy group, and which alkyl grup or the alkyl moiety of the aralkyl group may contain a $-SO_2NH-$, $-CONH-$ or $-CO-$ group in the chain thereof; $R_6$ is a $C_1-C_3$ alkyl group or a $C_7-C_8$ aralkyl group which alkyl or aralkyl group may be unsubstituted or substituted with a halogen atom, a hydroxy group or a $C_1-C_4$ alkoxy group; and $X^\ominus$ is an anion; and of the formula (C):

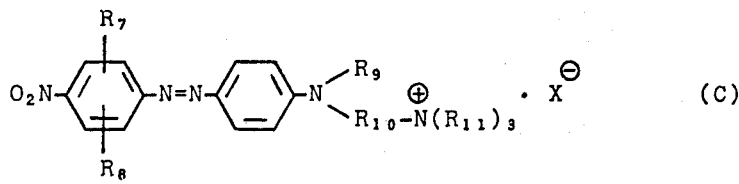

wherein $R_7$ and $R_8$, which may be the same or different, each is a hydrogen atom, a halogen atom, a $C_1$–$C_3$ alkyl group or a cyano group; $R_9$ is a $C_1$–$C_3$ alkyl group or a $C_7$–$C_8$ aralkyl group; $R_{10}$ is a $C_1$–$C_3$ alkylene group; $R_{11}$ is a $C_1$–$C_3$ alkyl group; and $X^\ominus$ is an anion; and of the formula (D):

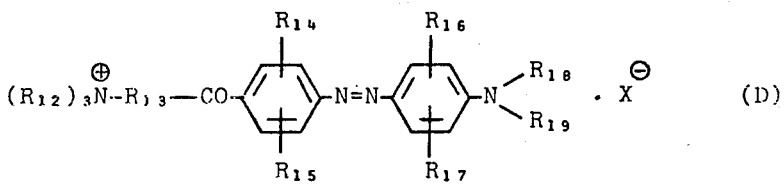

wherein $R_{12}$ is a $C_1$–$C_3$ alkyl group; $R_{13}$ is a $C_1$–$C_3$ alkylene group; $R_{14}$, $R_{15}$, $R_{16}$ and $R_{17}$, which may be the same or different, each is a hydrogen atom, a halogen atom or a cyano group; $R_{18}$ and $R_{19}$, which may be the same or different, each is a hydrogen atom, a $C_1$–$C_3$ alkyl group or a $C_7$–$C_8$ aralkyl group, which alkyl or aralkyl group may be unsubstituted or substituted with a halogen atom, a cyano grup or a hydroxy group; and $X^\ominus$ is an anion.

Further, the present invention provides a dischargeable black dyeing process for acid modified polyester fibers which comprises dyeing the polyester fibers with a dyeing bath containing the combination of dyes as defined above and additionally at least one dye of the formula (E):

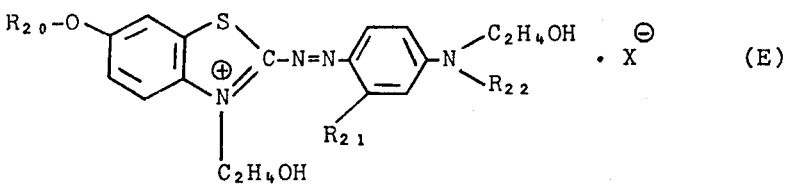

wherein $R_{20}$ and $R_{21}$, which may be the same or different, each is a $C_1$–$C_2$ alkyl group; $R_{22}$ is a $C_1$–$C_3$ alkyl group or a $C_7$–$C_8$ aralkyl group, which alkyl or aralkyl group may be unsubstituted or substituted with a halogen atom or hydroxy group; $X^\ominus$ is an anion, and of the formula (F):

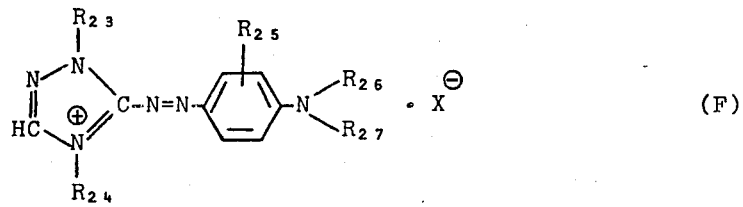

wherein $R_{23}$, $R_{24}$ and $R_{25}$, which may be the same or different, each is a $C_1$–$C_3$ alkyl group of a $C_7$–$C_8$ aralkyl group, which alkyl or aralkyl group may be unsubstituted or substituted with a halogen atom, a hydroxy group or a $C_1$–$C_4$ alkoxy group; $R_{26}$ and $R_{27}$, which may be the same or different, each is a $C_1$–$C_3$ alkyl group or a $C_7$–$C_8$ aralkyl group, which alkyl or aralkyl group may be unsubstituted or substituted with a halogen atom, a hydroxy group or a $C_1$–$C_4$ alkoxy group, or a cyclohexyl group; and $X^\ominus$ is an anion.

DETAILED DESCRIPTION OF THE INVENTION

In the present invention, the dye selected from the dyes included in each formula (A), (B), (C), (D), (E) or (F) can be used individually or as a combination of two or more thereof.

Specific examples of dyes represented by the formula (A) are the following dyes.

(A)-(1)

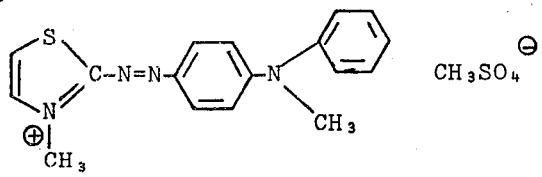

(A)-(2)
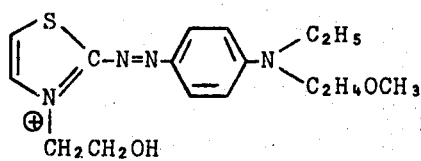
(B)-(2)
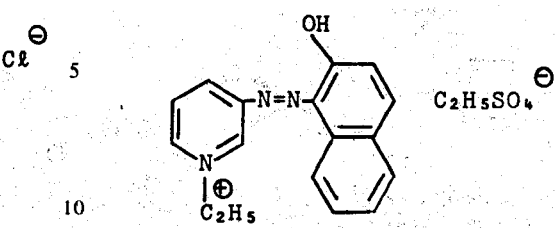
(A)-(3)
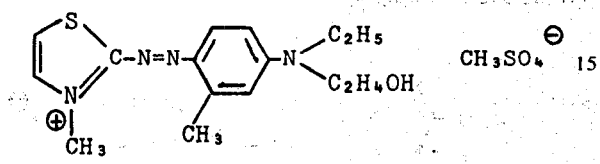
(B)-(3)
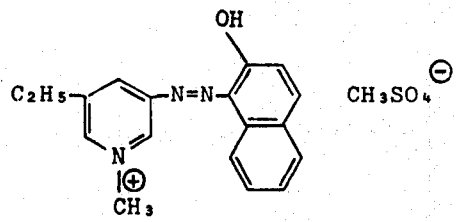
These dyes can be prepared by the method disclosed in, for example, West German Pat. No. 1,011,396.
Specific examples of dyes represented by the formula (B) are the following dyes.
(B)-(1)
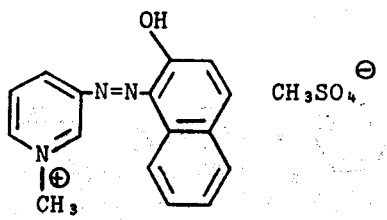
These dyes can be prepared according to the method disclosed in, for example, Japanese Pat. No. 242/1964.
Specific examples of dyes represented by the formula (C) are the following dyes.
(C)-(1)
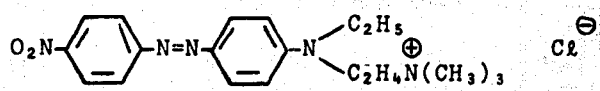
(C)-(2)
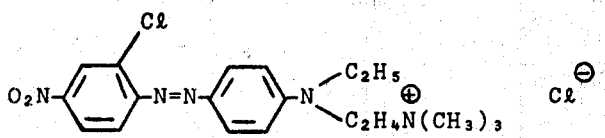
(C)-(3)
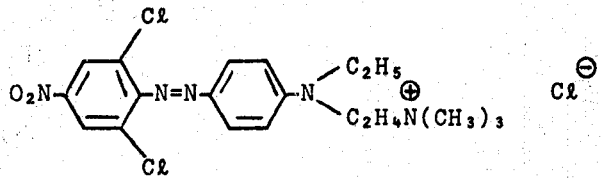

(C)-(4)

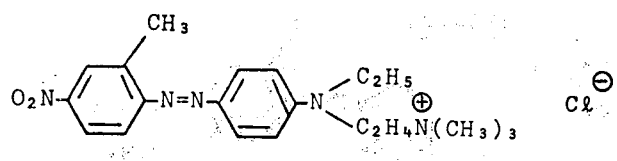

These dyes are well known as dyes for dyeig acrylic fibers, and can be prepared according to the method disclosed in, for example, West German Pat. No. 1,011,396.

Specific examples of dyes represented by the formula (D) are the following dyes.

(D)-(1)

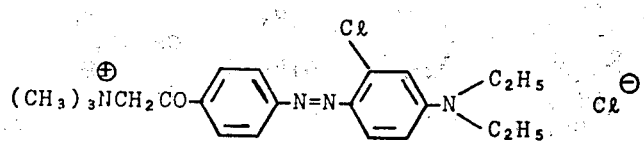

(D)-(2)

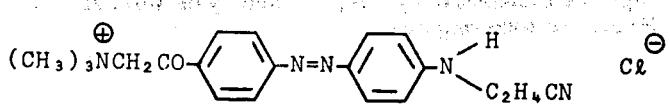

(D)-(3)

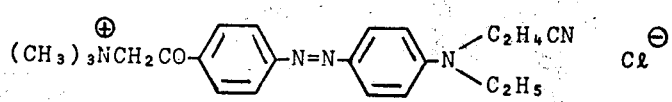

(D)-(4)

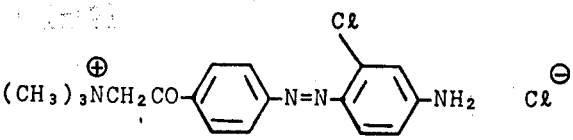

These dyes can be prepared according to the method disclosed in, for example, Japanese Pat. No. 433/1959.

Specific examples of dyes represented by the formula (E) are the following dyes.

(E)-(1)

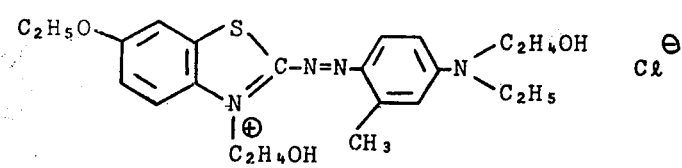

(E)-(2)

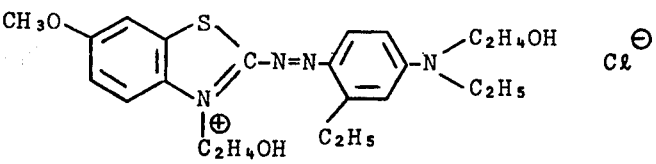

(E)-(3)

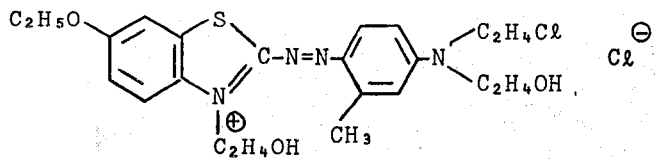

These dyes can be prepared according to the methods disclosed in, for example, West German Pat. Nos. 1,044,023 and 1,050,940 or Japanese Pat. No. 15,791/1971.

Specific examples of dyes represented by the formula (F) are the following dyes.

(F)-(1)

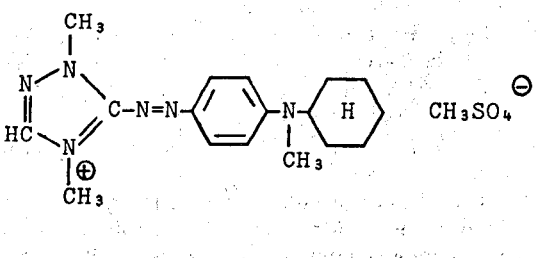

(F)-(2)

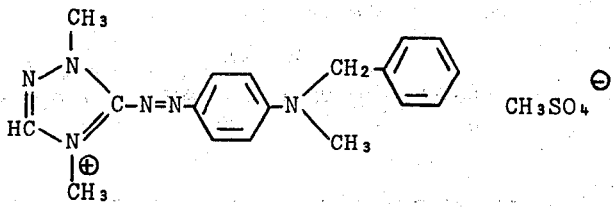

(F)-(3)

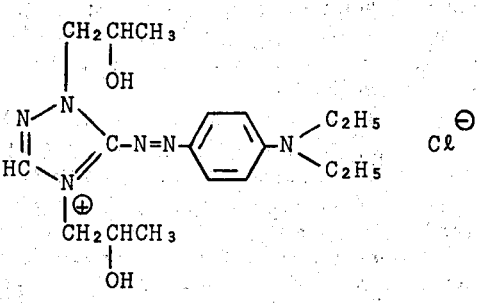

These dyes can be prepared according to the methods disclosed in, for example, West German Pat. Nos. 1,044,023 and 1,077,808, or Japanese Pat. No. 15,791/1971.

In the present invention, the dyes represented by the formulae (A), (B), (C), (D), (E) and (F) can, of course, be blended initially and the blend can be used as a blended black dye. Although the amount of each dye blended varies depending upon the color, shade, tinting strength and the like of the dyes, at least 2% by weight of each of the kinds of dyes based on the total weight of the dyes blended is usually suitable.

Furthermore, if desired, dischargeable dyes other than those represented by the above-described formulae (A), (B), (C), (D), (E) and (F) can be incorporated in the dyeing bath for the purpose of shading. Examples of such dyes are the following dyes

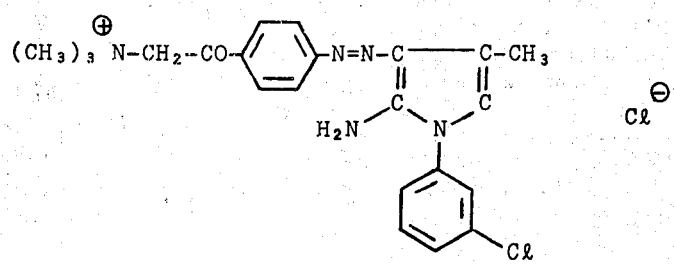

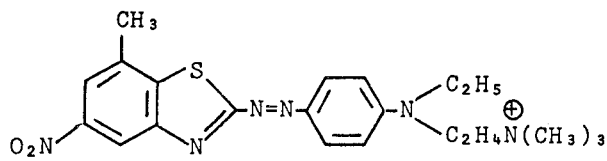 

The term "acid modified polyester fiber" as used herein means a polyester fiber which has been modified by introducing an acid group such as a sulfonic acid group into the polyester so that the fibers become dyeable with cationic dyes. Specific examples of acid modified polyester fibers are "Dacron T-64", "Dacron T-65", "Dacron Tβ" "Dacron T-89", "Dacron T-92" and "Dacron T-161" (trade names, produced by E.I. du Pont de Nemours and Co.) "Trevira 440" (trade name, produced by Hystron), and "Kodel 511" (trade name, produced by Tennessee Eastman, Inc.).

The dyeing can be conducted using a so-called high temperature dyeing or carrier dyeing method. That is, high temperature dyeing can be effected at a temperature of about 115°C to 130°C for about 40 to 100 minutes, with the pH of the dye bath being adjusted to about 3.5 to 5.0 using a buffer such as sodium acetate and acetic acid. In order to prevent decomposition of the acid modified polyester fibers during the dyeing, for example, anhydrous sodium sulfate can be added to the dye bath in an amount of about 2.0 to 6.0 g per liter of the dye bath. Carrier dyeing can be effected at a temperature of about 100°C to 105°C for about 60 to 120 minutes using a carrier such as biphenyl, butyl benzoate or o-phenylphenol which is dispersed using a nonionic surface active agent, with the pH of the dye bath being adjusted to about 3.5 to 5.0 using a buffer such as sodium acetate and acetic acid. The fibers dyed can be aftertreated in a conventional manner to obtain a black dyed product. The dye bath ratio in both dyeing methods is usually about 1:10 to 1:150 by weight of fibers to be dyed to the dye bath.

The discharge of the product ground-dyed can be conducted using a so-called white or color-discharging method. That is, the product is printed with a discharging paste, predried and then steamed with air-saturated with water vapor at a temperature of about 115° to 130°C (or at 110°C when a carrier described below is used) for 15 to 40 minutes, usually at 120° to 125°C for 20 to 30 minutes, whereby the part printed with the discharging paste can be white or color-discharged.

The discharging paste can be prepared by known methods, for example, by mixing a thickener, a discharging agent, and other additives such as dissolving agents, pH controlling agents, carriers, hydrotroping agents, neutralizing agents and the like. Suitable thickeners include finishing starches such as carboxymethyl starch, carboxyethyl starch, hydroxyethyl starch, roasted starch, α-starch and cationic starch; finishing natural gums such as etherified locust bean gun; natural gums such as locust bean gum and guar gum; and Yuzen thickener. However, in the color-discharging method, a natural gun can not be used.

Suitable discharging agents include stannous chloride and a commercially available Decrolin Soluble Concentrate (trade name, produced by Basf A.G.). Stannous chloride can be advantageously used in the color-discharging method.

Suitable dissolving agents include acetic acid and glycols.

pH Controlling agents which can be used in the color-discharging method non-volatile organic acids such as lactic acid, tartaric acid, citric acid and malic acid.

Examples of carriers include nonionic swelling compounds such as p-phenylphenol.

Urea and thiourea can be used as the hydrotroping agent or neutralizing agent.

In the white-discharging method, zinc oxide, titanium dioxide and optical whitening agents can be used in order to increase the whiteness.

Dyes incorporated into the discharging paste in the color-discharging method should be those which are stable to the above-described steaming, and suitable examples thereof include C.I. Basic Yellows 21, C.I. Basic Yellow 28, C.I. Basic Violet 11, C.I. Basic Blue 69 and the like.

The present invention will be illustrated in greater detail below with reference to the followng examples, which are given only for the purpose of illustration and are not to be interpreted as limiting. In the examples, all parts, percents, ratios and the like are by weight unless otherwise indicated.

EXAMPLE 1

The following dyes were dissolved in 100 parts of hot water:

|  | parts |
| --- | --- |
| Dye (A) - (1) | 0.8 |
| Dye (B) - (1) | 1.4 |

The dye solution thus obtained was diluted with 5,000 parts of water, and then 1 part of acetic acid and 0.5 part of anhydrous sodium acetate were added thereto to prepare a dyeing bath.

Then, 100 parts of a plan weave fabric of Dacron T-65 were immersed in the bath and then dyeing was carried out by increasing the bath temperature to 120°C over a 40 minute period while stirring and keeping the bath at the same temperature for 60 minutes. The fabric was then washed with water and dried.

Thus, the Dacron T-65 plain weave fabric was dyed a deep and fast black, which was effectively discharging as follows.

Dacron T-65 which was dyed in Example 1 was white or color-discharged using a printing paste of the following formulation:

|  | parts |
| --- | --- |
| Discharging Agent (stannous chloride) | 9 |
| Acetic Acid (50% aq. soln.) | 2 |
| Thiodiglycol | 2 |
| Hot Water | 11 |
| Yuzen Thickener (40% aq. soln.) | 65 |
| Urea | 5 |
| p-Phenylphenol (carrier) | 3 |
| Nonionic Surfactant | 1 |
| Titanium White or Dye for Color-Discharge | 2 |
|  | 100 |

The printing paste obtained was printed on the above-described black dyeings followed by steaming at 120°C for 30 minutes.

The titanium white containing paste and the color-discharge dye containing paste gave white discharge and color discharge, respectively, with a very high effect.

REFERENCE EXAMPLE 1

On the other hand, when Dye (A) – (1) was replaced by the following dye:

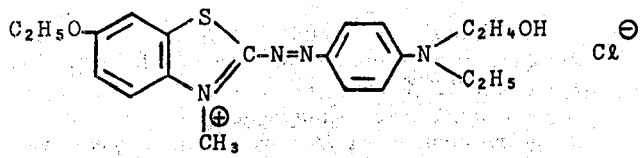

and the procedures of Example 1 repeated, the discharge was carried out without problems, but dyes in the area other than that to be discharged were decomposed in the discharge treatment., resulting in a marked discoloration.

EXAMPLE 2

The following dyes were dissolved in 100 parts of hot water.

|  | parts |
|---|---|
| Dye (A) - (3) | 0.7 |
| Dye (C) - (1) | 1.5 |

The dye solution thus-obtained was diluted with 1,000 parts of water, and then 1 part of acetic acid and 0.5 part of anhydrous sodium acetate were added thereto to prepare a dyeing bath.

One hundred parts of a knitted fabric of Dacron T-92 were immersed in the bath and then dyeing was carried out by increasing the bath temperature to 120°C over a 40 minute period while stirring and keeping the bath at the same temperature for 60 minutes. The fabric was then washed with water and dried.

Thus, the Dacron T-92 knitted fabric was dyed a dischargeable deep black.

EXAMPLE 3

Dyeing was carried out in the same manner as described in Example 1 except that the following dyes were used instead of the dyes of Example 1;

|  | parts |
|---|---|
| Dye (A) - (2) | 0.75 |
| Dye (D) - (2) | 1.4 |

Thus, dischargeable black dyeings were obtained.

EXAMPLE 4

Dyeing was carried out in the same manner as described in Example 1 except that the following dyes were used instead of the dyes of Example 1:

|  | parts |
|---|---|
| Dye (A) - (1) | 0.7 |
| Dye (B) - (1) | 1.3 |
| Dye (F) - (2) | 0.2 |

Thus, dischargeable black dyeings were obtained.

EXAMPLE 5

The following dyes were dissolved in 100 parts of hot water:

|  | parts |
|---|---|
| Dye (A) - (1) | 0.5 |
| Dye (B) - (1) | 0.67 |
| Dye (C) - (1) | 0.8 |
| Dye (E) - (1) | 0.2 |

The dye solution thus-obtained was diluted with 5,000 parts of water, and then 1 part of acetic acid and 0.5 part of anhydrous sodium acetate were added thereto to prepare a dyeing bath.

Then, 100 parts of a plain weave fabric of Dacron T-65 were immersed in the bath and then dyeing was carried out by increasing the bath temperature to 120°C over a 40 minute period while stirring and keeping the bath at the same temperature for 60 minutes. The fabric was then washed with water and dried.

Thus, the Dacron T-65 plain weave fabric was dyed a dischargeable, deep and fast black.

When Dye (E) – (1) in the above-described Example 5 was replaced by the following dye not containing a methyl group:

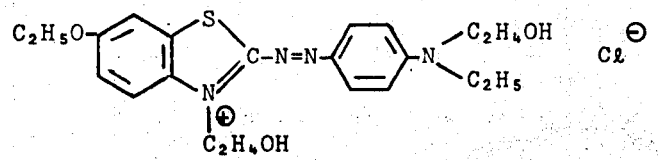

discharge was carried out without problems, but dyes in the area other than that to be discharged were decomposed in the discharge treatment, resulting in a marked discoloration.

EXAMPLE 6

The following dyes were dissolved in 100 parts of hot water:

|  | parts |
|---|---|
| Dye (A) - (3) | 0.15 |
| Dye (D) - (2) | 1.1 |
| Dye (E) - (2) | 0.7 |
| Dye (F) - (1) | 0.26 |

The dye solution thus-obtained was diluted with 1,000 parts of water, and then 1 part of acetic acid and 0.5 part of anhydrous sodium acetate were added thereto to prepare a dyeing bath.

One hundred parts of a knitted fabric of Dacron T-92 were immersed in the bath and then dyeing was carried out by increasing the bath temperature to 120°C over a 40 minute period while stirring and keeping the bath at the same temperature for 60 minutes. The fabric was then washed with water and dried.

Thus, the Dacron T92 knitted fabric was dyed a dischargeable deep black.

EXAMPLE 7

Dyeing was carried out in the same manner as described in Example 1 except that the following dyes were used instead of the dyes of Example 1:

|  | parts |
| --- | --- |
| Dye (A) - (2) | 0.16 |
| Dye (C) - (1) | 1.1 |
| Dye (C) - (2) | 0.26 |
| Dye (E) - (2) | 0.7 |

Thus, dischargeable black dyeings were obtained.

EXAMPLE 8

Dyeing was carried out in the same manner as described in Example 1 except that the following dyes were used instead of the dyes of Example 1:

|  | parts |
| --- | --- |
| Dye (A) - (3) | 0.5 |
| Dye (C) - (1) | 0.7 |
| Dye (D) - (1) | 0.8 |
| Dye (E) - (3) | 0.2 |

Thus, dischargeable black dyeings were obtained.

EXAMPLE 9

The following dyes were dissolved in 100 parts of hot water:

|  | parts |
| --- | --- |
| Dye (A) - (1) | 0.54 |
| Dye (B) - (1) | 1.5 |
| Dye (C) - (1) | 0.2 |
| Dye (C) - (2) | 0.12 |
| Dye (E) - (1) | 0.3 |

The dye solution thus-obtained was diluted with 5,000 parts of water and then 1 part of acetic acid, 0.5 part of anhydrous sodium acetate and 25 parts of Estrol Carrier S (a registered trade mark of Sumitomo Chemical Co., Ltd.) were added thereto to prepare a dyeing bath.

One hundred parts of woolly amunzen of an acid modified polyester were immersed in the bath and then dyeing was carried out by increasing the bath temperature to 105°C over a 40 minute period while stirring and keeping the bath at the same temperature for 60 minutes. The woolly amunzen was then freed from the carrier, washed with water and dried.

Thus, the acid modified polyester woolly amunzen was dyed a dischargeable, deep and fast black.

The acid modified polyester woolly amunzen which had been dyed above was white or color-discharged using a printing paste of the following formulation:

|  | parts |
| --- | --- |
| Stannous Chloride | 9 |
| Dicyandiamide | 3 |
| Acetic Acid (50% aq. soln.) | 2 |
| Glysolve AOX (a registered trade mark of Meisei Kagaku Co.) | 2 |
| Hot Water | 23 |
| Meypro Gum NP 12% Paste (a registered trade mark of Mey Hall Co., Switzerland) | 55 |
| Tartaric Acid | 1 |
| Tetrocin CD-PS (a carrier, a registered trade mark of Yamakawa Yakuhin Co.) | 3 |
| Titanium White or Dye for Color-Discharge | 2 |
|  | 100 |

The printing paste obtained was printed on the abovedescribed black ground dyeings followed by steaming at 120°C for 30 minutes.

The titanium white containing paste and the colordischarge dye containing paste gave a white discharge and colordischarge, respectively, with a very high effect.

While the invention has been described in detail and with reference to specific embodiments thereof, it will be apparent to one skilled in the art that various changes and modifications can be made therein without departing from the spirit and scope thereof.

What is claimed is:

1. A process for dyeing acid modified polyester fibers a black comprising contacting said polyester fibers with a dye bath containing a combination of dyes comprising:

1. at least one dye of the formula (A):

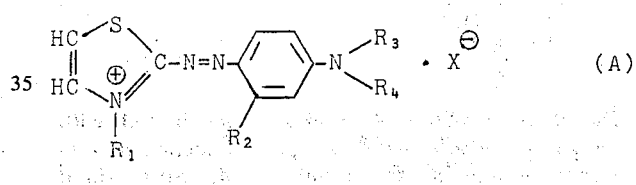

wherein $R_1$ is a $C_1$–$C_3$ alkyl group which may be unsubstituted or substituted with a hydroxy group of a $C_1$–$C_4$ alkoxy group; $R_2$ is a hydrogen atom or a $C_1$–$C_3$ alkyl group; $R_3$ and $R_4$, which may be the same or different, each is a cyclohexyl group, a $C_1$–$C_3$ alkyl group which may be unsubstituted or substituted with a hydroxy group or a $C_1$–$C_4$ alkoxy group, a phenyl group or a $C_7$–$C_8$ aralkyl group, which phenyl or aralkyl group may be unsubstituted or substituted with a halogen atom; and $X^-$ is an anion; and 2. at least one dye of the formula (B):

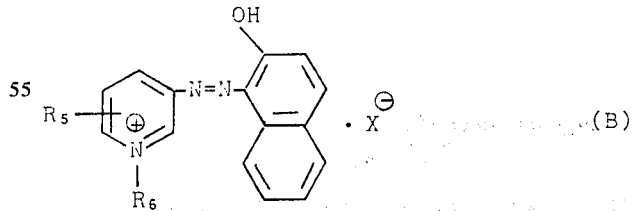

wherein $R_5$ is a hydrogen atom, a $C_1$–$C_{12}$ alkyl group or a $C_7$–$C_8$ aralkyl group, which alkyl or aralkyl group may be unsubstituted or substituted with a halogen atom, a hydroxy group or a $C_1$–$C_4$ alkoxy group, and which alkyl group or the alkyl moiety of the aralkyl group may contain a —$SO_2NH$—, —$CONH$— or —$CO$— group in the chain thereof; $R_6$ is a $C_1$–$C_3$ alkyl group or a $C_7$–$C_8$ aralkyl group which alkyl or aralkyl group may be unsubstituted or substituted with a halogen atom, a hydroxy group or a $C_1$–$C_4$ alkoxy group; and $X^-$ is an anion; and of the formula (C):

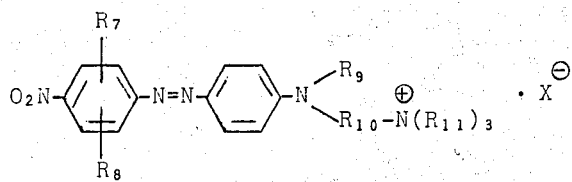

wherein $R_7$ and $R_8$, which may be the same or different, each is a hydrogen atom, a halogen atom, a $C_1$–$C_3$ alkyl group or a cyano group; $R_9$ is a $C_1$–$C_3$ alkyl group or a $C_7$–$C_8$ aralkyl group; $R_{10}$ is a $C_1$–$C_3$ alkylene group; $R_{11}$ is a $C_1$–$C_3$ alkyl group; and $X^-$ is an anion; and of the formula (D):

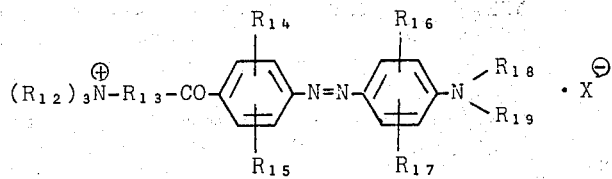

wherein $R_{12}$ is a $C_1$–$C_3$ alkyl group; $R_{13}$ is a $C_1$–$C_3$ alkylene group; $R_{14}$, $R_{15}$, $R_{16}$ and $R_{17}$, which may be the same or different, each is a hydrogen atom, a halogen atom or a cyano group; $R_{18}$ and $R_{19}$, which may be the same or different, each is a hydrogen atom, a $C_1$–$C_3$ alkyl group or a $C_7$–$C_8$ aralkyl group, which alkyl or aralkyl group may be unsubstituted or substituted with a halogen atom, a cyano group or a hydroxy group; and $X^-$ is an anion.

2. The process according to claim 1, wherein the combination further includes at least one dye of the formula (E);

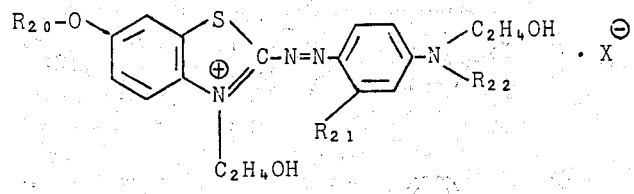

wherein $R_{20}$ and $R_{21}$, which may be the same or different, each is a $C_1$–$C_2$ alkyl group; $R_{22}$ is a $C_1$–$C_3$ alkyl group or a $C_7$–$C_8$ aralkyl group, which alkyl or aralkyl group may be unsubstituted or substituted with a halogen atom or a hydroxy group; $X^-$ is an anion, and of the formula (F):

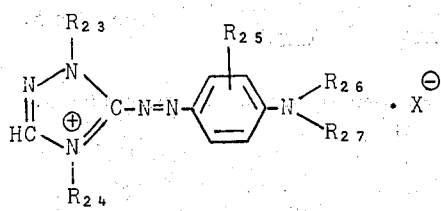

wherein $R_{23}$, $R_{24}$ and $R_{25}$, which may be the same or different, each is a $C_1$–$C_3$ alkyl group or a $C_7$–$C_8$ aralkyl group, which alkyl or aralkyl group may be unsubstituted or substituted with a halogen atom, a hydroxy group or a $C_1$–$C_4$ alkoxy group; $R_{26}$ and $R_{27}$, which may be the same or different, each is a $C_1$–$C_3$ alkyl group or a $C_7$–$C_8$ aralkyl group, which alkyl or aralkyl group may be unsubstituted or substituted with a halogen atom, a hydroxy group or a $C_1$–$C_4$ alkoxy group, or a cyclohexyl group; and $X^-$ is an anion.

3. The process according to claim 1, wherein the dye of the formula (A) is:

(D)

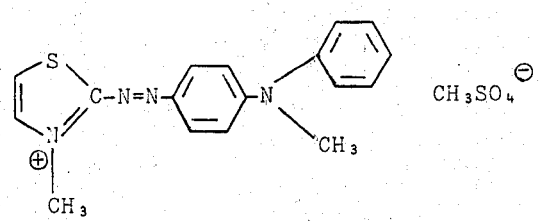

(E)

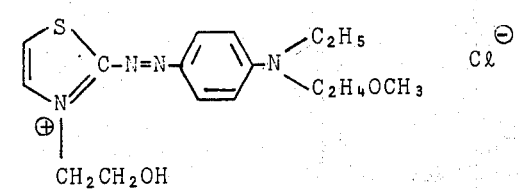

(F)

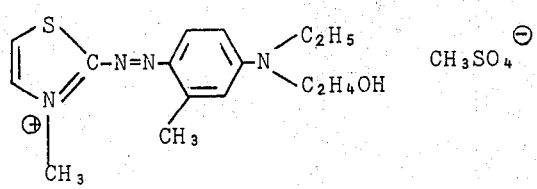

wherein the dye of the formula (B) is:
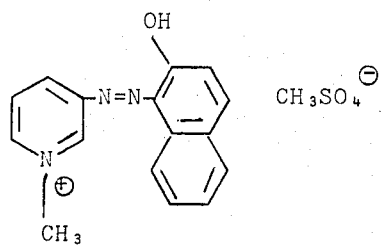
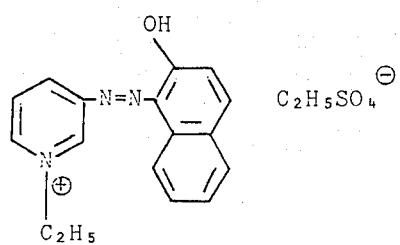
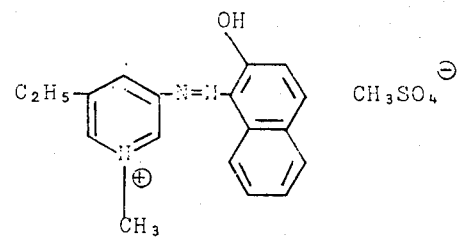
wherein the dye of the formula (C) is:
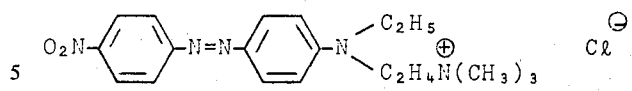
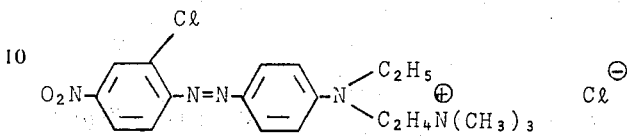
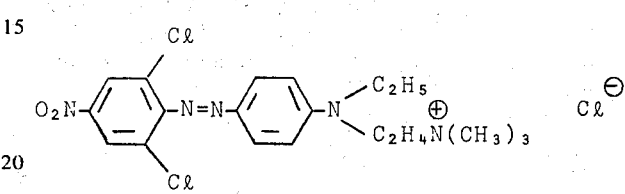
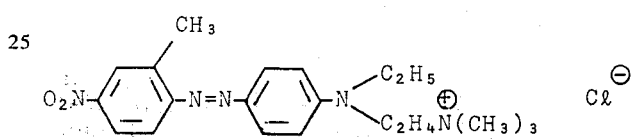
and, wherein the dye of the formula (D) is:
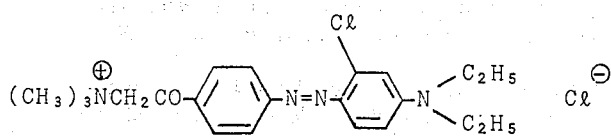
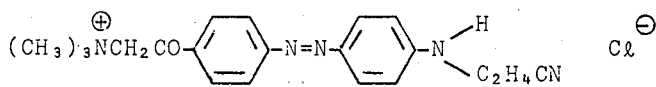
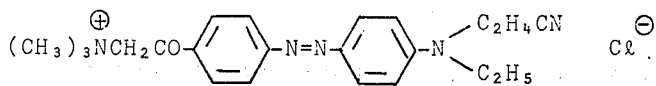
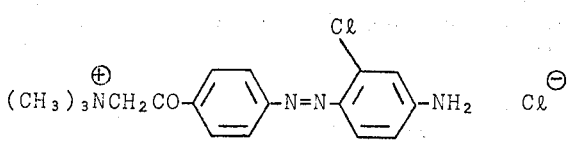
4. The process according to claim 2, wherein the dye of the formula (E) is:
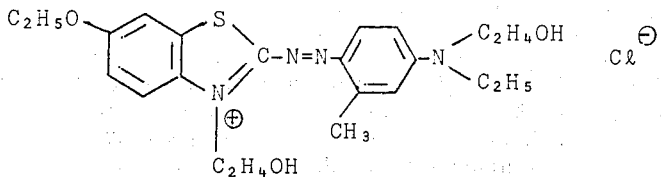

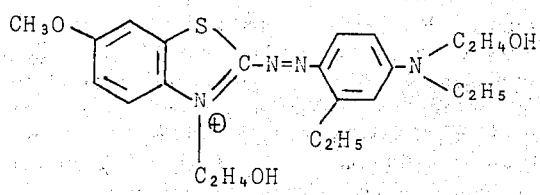

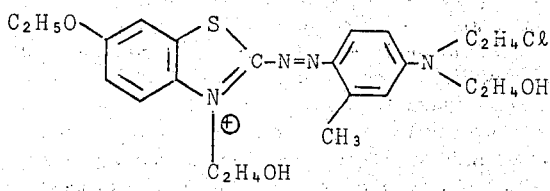

and, wherein the dye of the formula (F) is:

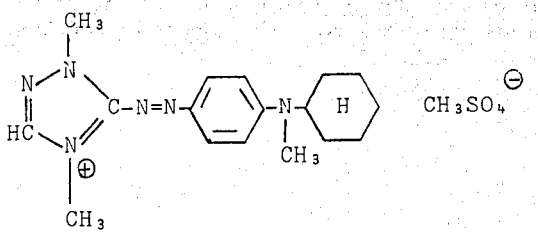

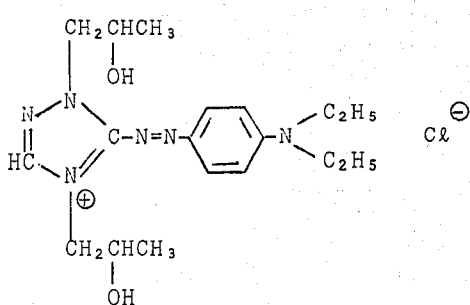

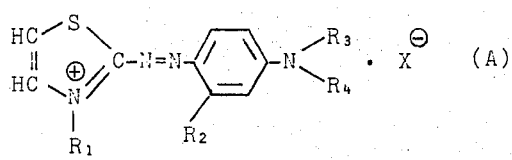

5. A black dye comprising a combination of,
1. at least one dye of the formula (A):

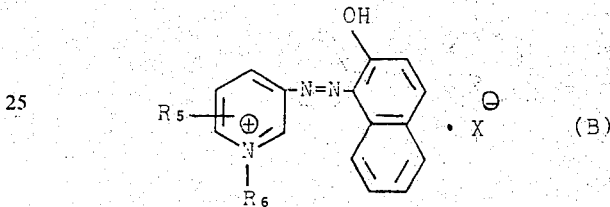

wherein $R_1$ is a $C_1$–$C_3$ alkyl group which may be unsubstituted or substituted with a hydroxy group or a $C_1$–$C_4$ alkoxy group; $R_2$ is a hydrogen atom or a $C_1$–$C_3$ alkyl group; $R_3$ and $R_4$, which may be the same or different, each is a cyclohexyl group, a $C_1$–$C_3$ alkyl group which may be unsubstituted or substituted with a hydroxy group or a $C_1$–$C_4$ alkoxy group, a phenyl group or a $C_7$–$C_8$ aralkyl group, which phenyl or aralkyl groyp may be unsubstituted or substituted with a halogen atom; and $X^-$ is an anion; and 2. at least one dye of the formula (B):

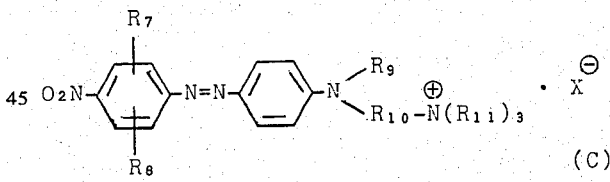

wherein $R_5$ is a hydrogen atom, a $C_1$–$C_{12}$ alkyl group or a $C_7$–$C_8$ aralkyl group, which alkyl or aralkyl group may be unsubstituted or substituted with a halogen atom, a hydroxy group or a $C_1$–$C_4$ alkoxy group, and which alkyl group or the alkyl moiety of the aralky group may contain a —$SO_2NH$—, —$CONH$— or —$CO$— group in the chain thereof; $R_6$ is a $C_1$–$C_3$ alkyl group or a $C_7$–$C_8$ aralkyl group which alkyl or aralkyl group may be unsubstituted or substituted with a halogen atom, a hydroxy group or a $C_1$–$C_4$ alkoxy group; and $X^-$ is an anion; and of the formula (C):

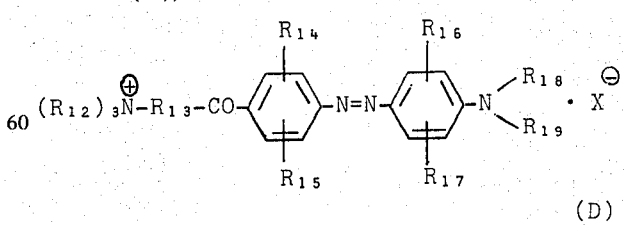

wherein $R_7$ and $R_8$, which may be the same or different, each is a hydrogen atom, a halogen atom, a $C_1$–$C_3$ alkyl group or a cyano group; $R_9$ is a $C_1$–$C_3$ alkyl group or a $C_7$–$C_8$ aralkyl group; $R_{10}$ is a $C_1$–$C_3$ alkylene group; $R_{11}$ is a $C_1$–$C_3$ alkyl group; and $X^-$ is an anion; and of the formula (D);

(R$_{12}$)$_3$N$^⊕$–R$_{13}$–CO–[ring R$_{14}$,R$_{15}$]–N=N–[ring R$_{16}$,R$_{17}$]–N(R$_{18}$)(R$_{19}$) · X$^⊖$ (D)

wherein $R_{12}$ is a $C_1$–$C_3$ alkyl group; $R_{13}$ is a $C_1$–$C_3$ alkylene group; $R_{14}$, $R_{15}$, $R_{16}$ and $R_{17}$, which may be the same or different, each is a hydrogen atom, a halogen atom or a cyano group; $R_{18}$ and $R_{19}$, which may be the same or different, each is a hydrogen atom, a $C_1$–$C_3$ alkyl group or a $C_7$–$C_8$ aralkyl group, which alkyl or aralkyl group may be unsubstituted or substituted with a halogen atom, a cyano group or a hydroxy group; and $X^-$ is an anion.

6. The black dye according to claim 5, wherein the combination further contains:

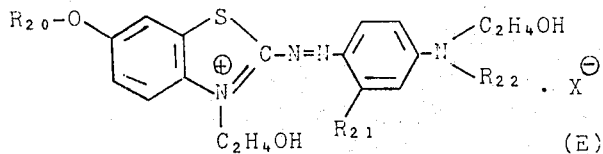

wherein $R_{20}$ and $R_{21}$, which may be the same or different, each is a $C_1$–$C_2$ alkyl group; $R_{22}$ is a $C_1$–$C_3$ alkyl group or a $C_7$–$C_8$ aralkyl group, which alkyl or aralkyl group may be unsubstituted or substituted with a halogen atom or a hydroxy group; $X^-$ is an anion; and of the formula (F):

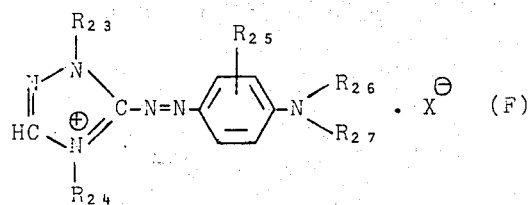

wherein $R_{23}$, $R_{24}$ and $R_{25}$, which may be the same or different, each is a $C_1$–$C_3$ alkyl group or a $C_7$–$C_8$ aralkyl group, which alkyl or aralkyl group may be unsubstituted or substituted with a halogen atom, a hydroxy group or a $C_1$–$C_4$ alkoxy group; $R_{26}$ and $R_{27}$, which may be the same or different, each is a $C_1$–$C_3$ alkyl group or a $C_7$–$C_8$ aralkyl group, which alkyl or aralkyl group may be unsubstituted or substituted with a halogen atom, a hydroxy group or a $C_1$–$C_4$ alkoxy group, or a cyclohexyl group; and $X^-$ is an anion.

7. An acid modified polyester fiber comprising the acid modified polyester fiber dyed according to the process of claim 1.

8. A process for white or color-discharging dyed acid modifed polyester fibers comprising subjecting the acid modified polyester fibers according to the process of claim 1 to a white or color-discharge treatment.

9. An acid modified polyester fiber white or colordischarged comprising the white or color-discharged polyester fiber produced according to the process of claim 8.

* * * * *